COATING OR PLASTIC.

99

Patented Dec. 7, 1926.

1,610,211

UNITED STATES PATENT OFFICE.

WILLIAM HENDRY BARKER, OF NEW YORK, N. Y., ASSIGNOR TO ROGER J. D. ORN, OF NEW YORK, N. Y.

BUILDING MATERIAL AND METHOD FOR PRODUCING SAME.

No Drawing.   Application filed September 28, 1921.  Serial No. 503,805.

The invention relates to a building material which may be made in the form of slabs, tiles of various forms, shingles, or large sheets corrugated in shape, and resembling in form, the corrugated steel used for roofings and sidings for buildings.

The invention pertains to the character of materials known in the art as "artificial stone", inasmuch as it has something of the characteristics of stone or tile without the brittleness and undesirable qualities of stone or slate, inasmuch as it may be readily cut to any form, is somewhat resilient, and will stand unusual abuse.

The material has a resistance to atmospheric influences, is only slightly hydroscopic and is not affected by temperature or atmospheric changes.

The main object of the invention is to utilize the inherent qualities of certain materials to secure self cementation of said materials, in a form which is readily adapted for use either upon the so called "cylinder mold" machine or wet machine known in the art of paper making or cardboard making.

It has been a common practice in the art of making so called artificial stone or slabs, to employ a fibre, such as asbestos, which is first finely shredded to separate the fibres and then admixed with a cementing solution and fashioned into any desired form. These materials have been employed on the ordinary "cylinder mold" machine known to the paper maker, by utilizing a very large excess of water, to hold the cement (hydraulic cement) and the asbestos fibre in suspension, until the fibre is picked up upon the cylinder and forms a filter mat, to which and through which, the particles of hydraulic cement adhere. This mat, with the cement, is taken off on the felt of the machine and plied up until the required thickness is attained. By then subjecting the plied sheets to high pressure, the material is largely dehydrated and may be handled and trimmed and subsequently pressed into any desired form.

It has also been a practice to utilize an admixture of asbestos fibre and hydraulic cement and subject the mixture to a dehydrating action in molds, a material so formed being subsequently subjected to hydraulic pressure.

In either instance, the entire cementation depends upon the use of hydraulic cement first completely hydrated and then partially dehydrated by pressure.

Where a "cylinder mold" machine has been used, it has been a practice to reduce the asbestos fibre with an edge mill then beat it with an excess of water in a paper beating mill. After this beating has completely shredded the fibres, an excess of water is added and the hydraulic cement is gradually added to the mixture before it is passed in a state of agitation to the "cylinder mold" machine.

This process entails the utilization of very large quantities of water and involves the use of 80 to 90% of hydraulic cement with 10 to 20% of asbestos fibre.

The invention herein described contemplates the reduction both chemically and mechanically of certain elements of the fibre employed and other of the materials admixed therewith either with or without hydraulic cement, which will produce a sound material of stonelike characteristics, that may be fashioned into any desired form, at a much less cost than that represented by utilizing large quantities of hydraulic cement, with the asbestos fibre.

In carrying out the invention, asbestos fibre is employed as a mat, while a large content of silica in the form of fine sharp sand is treated and employed to give with the fibre a self cementing material.

The treated silica sand and asbestos may be admixed with varying quantities of hydraulic cement, if desired, to give certain characteristics. The hydraulic cement content of the mixture may, however, be reduced from present practice of from 80% to 90% down to 10% and still give a material the equivalent of that employing 80% to 90% as heretofore known in the art.

In carrying out the invention, advantage is taken of the natural characteristics of the asbestos fibre.

Asbestos generally has from 57.70 to 59.75 silica, 21.1 to 28.85 magnesia, 13.45 to 14.25 of lime. Of course, these analyses vary with different characters of materials. They are, however, quite compatible with the usual type of hydraulic cements.

Hydraulic cements generally average, silica 19 to 25, alumina 5 to 9, iron oxide 2 to 4, lime 60 to 64, magnesia 1 to 5.

Magnesia in hydraulic cement, is usually considered undesirable when the content is over 5% and, of course, if hydraulic cement and asbestos are admixed with the magnesia content of 21 to 28 in the asbestos, it is immediately apparent that the high limit of magnesia for cementation of the hydraulic cement is greatly exceeded.

In order to reduce this condition and at the same time provide self cementation for the asbestos content, the asbestos fibre is subjected to a hot treatment, together with a large content of silica in the presence of strong alkali such as sodium hydroxide (NaOH). Very good results can be secured by treatment with sodium carbonate.

In either case, the materials including the asbestos and silica sand, in certain proportions, are digested under comparatively high pressure, say from 150 to 200 pounds in the presence of preferably sodium hydroxide.

It will be immediately apparent that the silica of the sand running largely over 90% in silica and the silica of the asbestos will be reduced to an extent, depending upon the quantity of hydroxide employed, and the extent of digestion.

There is a further advantageous feature, in this reduction, which results in the etching of the fibre of the asbestos, so that to an extent, it loses its "slip" or "silkiness" and will more readily grip and hold the cementing materials. Furthermore the magnesia of the asbestos is modified.

In practice, the reduction has been effected with from 10 to 30% of hydroxide, the best results appear to lie between 10 and 20%.

It is not necessary to digest the entire mass of silica sand and asbestos but only so much as will give a cementation to the entire mass. Good results have been obtained with a mixture of 10% of the digested materials with 90% of the undigested materials.

Likewise, excellent results have been secured with 15% of asbestos fibre in place of 20 which has been commonly used where 80% of hydraulic cement is employed.

In carrying out the process, the asbestos fibre and silica or sand are digested with from 10 to 20% of sodium hydroxide for from two to four hours at a pressure of 100 to 150 pounds. This material is then passed to a beater where the asbestos fibre is beaten with the sand until in a very finely divided form.

The terms "digested" and "reduced", as used in the specification and claims indicate the conversion of the material under the action of sodium hydroxide or sodium carbonate under heat and comparatively high pressure.

The effect of the digestion appears to give the silica, when in the presence of the water of the beater a character of remaining in suspension, thus giving a very uniform semi-fluid.

After thoroughly beating, the pulp or sludge is carried to the feed box of the machine and passed to the traveling felt or screen. This is passed over a series of suction boxes where the excess water is withdrawn, leaving a firmly matted film upon the felt. From the felt it is picked up by a take off roll or cylinder and plied up to the required thickness The material thus formed is then subjected to high compression, where it becomes quite solid and firm and may then be pressed to any required form of shape or corrugation.

It has been found that the asbestos fibre is extremely spongy and that there is a distinct advantage, in subjecting the mixture to a series of suction effects, that is, passing the web over a suction box then relieving the suction and again passing it over a suction box. This seems to have a distinct consolidating action on the fibre and its cementing materials. The fibre forms a good filtering mat which catches the sand and cementing materials, passing only a comparatively clear liquid which, of course, is the excess water of the solution.

Where it seems desirable to use a small content of hydraulic cement, the cement is added and beaten into the mixture just before passing to the machine. The addition of a small content of cement gives an extremely smooth finish to the final product.

In order to make the final product less hydroscopic it may be immersed in a solution of aluminum sulphate. This, however, should preferably be applied after the first pressing in drying of the sheets, after which the sheets may be subjected to a high pressure. The sheets may also be rendered water resisting by immersion in a bath containing alum, sugar of lead and soda in the general proportion of 3 parts of alum to 1 part of sugar of lead and ½ part of soda.

In order to obviate the separate steps in the process using a bath of aluminum sulphate, it has been found that an exceptionally fine material can be produced by reducing aluminum sulphate by digestion with the asbestos fibre and silica sand in the presence of sodium hydroxide.

The general proportions which give excellent results are 15% of asbestos fibre, 20% of sodium hydroxide, 10% of aluminum sulphate, and 55% of silica sand.

Materials, in these proportions, when subjected to digestion for from 2 to 4 hours under a pressure of 100 to 150 pounds or more, are converted to such an extent that when partially dehydrated under the action of subatmospheric pressure, cement themselves into a homogeneous mass and when subjected to hydraulic pressure and dried, under slow drying conditions, form a self cementing stone-like material without the use of hydraulic cement.

Obviously, the invention is not to be confined to the particular proportions of material indicated above, nor is it to be confined to a composition consisting of silica sand, asbestos reduced with sodium hydroxide. It contemplates the digestion with a strong alkali of materials such as silica, asbestos, aluminum sulphate and analogous materials which, upon digestion, have a self cementing characteristic and which may be used with or without hydraulic cement.

What I claim as my invention and desire to secure by Letters Patent is:

1. A building material comprising silica and asbestos fibre which has been digested under heat and pressure in the presence of sodium hydroxide.

2. A building material comprising silica, aluminum sulphate and asbestos which has been digested in the presence of sodium hydroxide.

3. A building material comprising silica and asbestos which has been digested in the presence of sodium hydroxide and a content of hydraulic cement.

4. A building material comprising silica, aluminum sulphate and asbestos fibre which has been digested with sodium hydroxide and a content of hydraulic cement.

5. A method of producing a building material which consists in reducing silica and asbestos fibre under heat and pressure, in the presence of sodium hydroxide, beating said materials and partially dehydrating the beaten material and pressing said material to further dehydrate and consolidate it.

6. A method of producing a building material which consists in reducing silica and asbestos fibre under heat and pressure, in the presence of sodium hydroxide, beating said materials adding thereto a comparatively small content of hydraulic cement and partially dehydrating the beaten material and compressing said material to further dehydrate and consolidate it.

7. A method of producing a building material which consists in reducing silica, asbestos fibre and aluminum sulphate by digestion in the presence of sodium hydroxide, beating said materials, so digested, partially dehydrating the material through suction apparatus and submitting the material in a partially dehydrated condition to the action of mechanical compression to further dehydrate and consolidate the material.

8. A method of producing a building material which consists in reducing silica, asbestos fibre and aluminum sulphate by digestion in the presence of sodium hydroxide, beating said materials, and adding thereto a content of hydraulic cement and beating the materials with the cement, partially dehydrating the material through suction apparatus and submitting the material in a partially dehydrated condition to the action of mechanical compression to further dehydrate and consolidate the material.

9. A building material containing 10 to 20% of asbestos fibre, 80 to 90% of silica reduced under heat and pressure with 20% of sodium hydroxide.

10. A building material containing from 10 to 20% of asbestos fibre, from 80 to 90% of silica treated under heat and pressure, with 20% of sodium hydroxide, and then combining with 10 to 20% of hydraulic cement.

11. A building material comprising 15% of asbestos fibre, 20% of sodium hydroxide, 10% of aluminum sulphate, the balance of silica sand.

12. A building material comprising 15% of asbestos fibre, 20% of sodium hydroxide, 10% of aluminum sulphate, silica sand and a content of hydraulic cement.

13. A building material comprising silica and asbestos fibre which has been digested under heat and pressure in the presence of an alkaline hydroxide.

WILLIAM HENDRY BARKER.